US009660886B1

(12) United States Patent
Ye et al.

(10) Patent No.: US 9,660,886 B1
(45) Date of Patent: May 23, 2017

(54) SCALABLE NETWORK ROUTE ANALYSIS (71) Applicant: Google Inc., Mountain View, CA (US)

(72) Inventors: Fei Ye, Mountain View, CA (US);
Shidong Zhang, San Jose, CA (US);
Mickey Ju, Sunnyvale, CA (US); Joon
Ong, Cupertino, CA (US); Amin
Vahdat, Los Altos, CA (US); Hongyi
Zeng, Stanford, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 14/444,156

(22) Filed: Jul. 28, 2014

Related U.S. Application Data (60) Provisional application No. 61/949,992, filed on Mar. 7, 2014, provisional application No. 61/974,172, filed on Apr. 2, 2014.

(51) Int. Cl.
H04L 12/26 (2006.01)
H04L 12/939 (2013.01)
H04L 12/58 (2006.01)
H04L 12/751 (2013.01)
H04L 12/24 (2006.01)

(52) U.S. Cl.
CPC ...... *H04L 43/0823* (2013.01); *H04L 43/0876* (2013.01); *H04L 41/0677* (2013.01); *H04L 45/02* (2013.01); *H04L 49/55* (2013.01); *H04L 51/30* (2013.01)

(58) Field of Classification Search
CPC ..... H04L 41/0677; H04L 45/02; H04L 51/30; H04L 43/0823; H04L 43/0876; H04L 49/55
See application file for complete search history.

(56) References Cited

U.S. PATENT DOCUMENTS 7,649,834 B2 *  1/2010  Badat ............... H04L 41/12
                                            370/216
7,860,106 B2 * 12/2010  Kecskemeti ...... H04L 45/02
                                            370/389
7,948,916 B2 *  5/2011  Mandavilli ........ H04L 45/02
                                            370/254

(Continued)

OTHER PUBLICATIONS

Lee, et al. An Internet Traffic Analysis Method with MapReduce, Network Operations and Management Symposium Workshops (NOMS Wksps), 2010 IEEE/IFIP. IEEE, Apr. 2010.

(Continued)

*Primary Examiner* — Asad Nawaz
*Assistant Examiner* — Kai Chang
(74) *Attorney, Agent, or Firm* — McDermott Will & Emery LLP (57) ABSTRACT This disclosure provides systems, methods and apparatus for providing a network verification system (NVS) to analyze and detect anomalies and errors within a network. The NVS requests forwarding tables from each of the switches within the network being analyzed, and generates directed forwarding graphs for each subnet within the network. Certain graph properties of the directed forwarding graphs are analyzed to detect anomalies or errors in the subnets represented by the directed forwarding graphs. In some implementations, the NVS can execute the generation of the directed forwarding graphs in parallel. In some implementations, the NVS can be implemented on a MapReduce system.

19 Claims, 8 Drawing Sheets

(56) References Cited

U.S. PATENT DOCUMENTS

| | | | | |
|---|---|---|---|---|
| 8,612,169 | B2 | 12/2013 | Lin et al. | |
| 2003/0112809 | A1* | 6/2003 | Bharali | H04L 45/02 370/400 |
| 2006/0256733 | A1* | 11/2006 | Bejerano | H04L 41/12 370/254 |
| 2007/0280197 | A1* | 12/2007 | Pearlman | H04L 45/02 370/351 |
| 2009/0276771 | A1* | 11/2009 | Nickolov | G06F 9/4856 717/177 |
| 2012/0173710 | A1* | 7/2012 | Rodriguez | H04L 43/026 709/224 |
| 2012/0278021 | A1* | 11/2012 | Lin | G06F 17/10 702/85 |
| 2014/0108640 | A1* | 4/2014 | Mathis | H04L 41/145 709/224 |
| 2015/0150017 | A1* | 5/2015 | Hu | G06F 12/00 718/103 |
| 2015/0150018 | A1* | 5/2015 | Hu | G06F 9/544 718/103 |

OTHER PUBLICATIONS

Kazemian, Peyman, George Varghese, and Nick McKeown. "Header space analysis: Static checking for networks." In Pesented as part of the 9th USENIX Symposium on Networked Systems Design and Implementation (NSDI 12), pp. 113-126. 2012.

Mai, Haohui, Ahmed Khurshid, Rachit Agarwal, Matthew Caesar, P. Godfrey, and Samuel Talmadge King. "Debugging the data plane with anteater." in ACM SIGCOMM Computer Communication Review, vol. 41, No. 4, pp. 290-301. ACM, 2011.

Khurshid, Ahmed, Xuan Zou, Wenxuan Zhou, Matthew Caesar, and P. Brighten Godfrey. "Veriflow: verifying network-wide invariants in real time." In Presented as part of the 10th USENIX Symposium on Networked Systems Design and mplementation (NSDI 13), pp. 15-27. 2013.

Kazemian, Peyman, Michael Chang, Hongyi Zeng, George Varghese, Nick McKeown, and Scott Whyte. "Real time network policy checking using header space analysis." in Presented as part of the 10th USENIX Symposium on Networked Systems Design and Implementation (NSDI 13), pp. 99-111. 2013.

* cited by examiner

Match Module 1:   <192.168.1/24; S11; S21, S22>
Match Module 2:   <192.168.0/24; S11; DIRECT>; <192.168.0/24; S12; S21, S22>
Match Module 3:   <192.168.0/24; S21; S11>; <192.168.1/24; S12; DIRECT>; <192.168.1/24; S21; S12>
Match Module 4:   <192.168.0/24; S22; S11>; <192.168.1/24; S22; S12>

SCALABLE NETWORK ROUTE ANALYSIS

CROSS REFERENCE TO RELATED PATENT APPLICATIONS

This application claims priority to U.S. Provisional Patent Application Ser. No. 61/949,992, filed Mar. 7, 2014, and to U.S. Provisional Patent Application Ser. No. 61/974,172, filed Apr. 2, 2014. The disclosure of each of the above mentioned applications is incorporated by reference herein.

TECHNICAL FIELD

This disclosure relates to the field of communication networks, and in particular to analyzing abnormalities in communication networks.

DESCRIPTION OF THE RELATED TECHNOLOGY

Large networks, such as data center networks, often have errors in the forwarding tables of switches. These errors may cause data packets to loop indefinitely or fall into black-holes or get dropped before they reach their intended destination. Modern data centers can employ more than 10,000 switches, each with its own forwarding table. In such large networks, failures can occur frequently.

SUMMARY

According to one aspect, the subject matter described in this disclosure relates to a method for analyzing a network for abnormalities. The method includes receiving routing information from a plurality of switches within a network. The method also includes processing N portions of the routing information, wherein processing each of the N portions includes identifying forwarding rules that pertain to each of M subnets, wherein a forwarding rule pertains to an Mth subnet if a prefix representing the Mth subnet can be fully included within a prefix associated with the forwarding rule. The method further includes forming M groups of forwarding rules, each group including forwarding rules that pertain to the same Mth subnet, generating M forwarding graphs for the M subnets, each of the M forwarding graphs being generated using the corresponding Mth group of forwarding rules, identifying graph properties representative of network abnormalities in any of the M forwarding graphs, and, indicating network abnormalities identified in any of the M forwarding graphs.

According to another aspect, the subject matter described in this disclosure relates to a system including a route dumper module, a forwarding rules splitting module, N match modules, a grouping module, and M graphing modules. The route dumper module is configured to receive a plurality of forwarding rules form a network. The forwarding rules splitting module is configured to form N portions of the plurality of forwarding rules. Each of the N match modules is configured to process one of the N portions to identify forwarding rules that pertain to each of M subnets, wherein a forwarding rule pertains to an Mth subnet if a prefix representing the Mth subnet can be fully included within a prefix associated with the forwarding rule. The grouping module is configured to form M groups of forwarding rules, each group including forwarding rules that pertain to the same Mth subnet, and each of the M graphing modules is configured to generate M forwarding graphs for the M subnets, each of the M forwarding graphs being generated using the corresponding Mth group of forwarding rules.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Data centers typically utilize packet switched networks for data communication. The packet switched networks can be implemented using a plurality of interconnected packet switches. Data packets can be communicated from one location in the network to another via the plurality of switches. The switches utilize forwarding or routing tables for routing packets to their appropriate destinations. In some instances, errors in the forwarding tables may cause packet delivery anomalies. Specifically, packet delivery anomalies can include, among others, loops and black-holes.

Figure 1A:
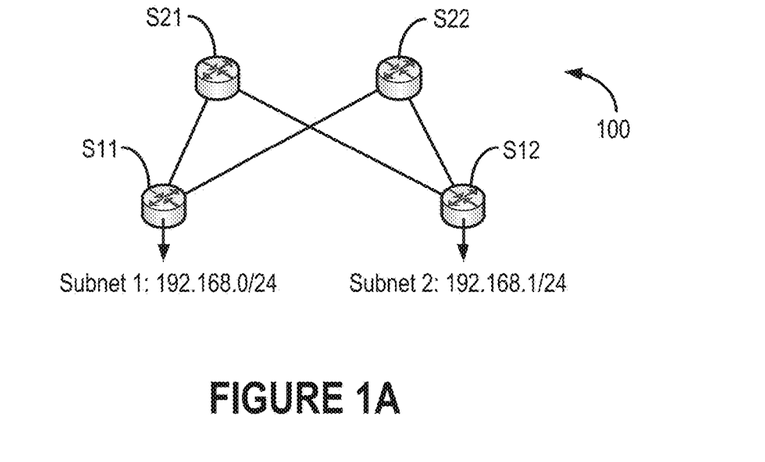
FIG. 1A shows a schematic of an example network.

FIG. 1A shows a schematic of an example network 100. In particular, FIG. 1A shows the example network 100 including four switches S11, S12, S21, and S22. In some implementations, the example network 100 can be an Ethernet network, and the switches S11, S12, S21, and S22 can be Ethernet switches. In some implementations, the example network 100 can include networks architectures such as, but not limited to, Fibre Channel, Fibre Channel over Ethernet (FCoE), InfiniBand, Asynchronous Transfer Mode (ATM), etc. In some implementations, the switches S11, S12, S21, and S22 can be configured to operate at multiple network layers, such as Ethernet and IP.

Switches S11 and S12 can include one or more ports that connect to a first subnet: subnet-1 and a second subnet: subnet-2, respectively. In some implementations, switches S11 and S12 can be configured as edge switches for the first and second subnet respectively. In some implementations, each of the two subnets can include a plurality of network devices such as servers. All network devices that belong to the same subnet can be addressed with a common, identical, most-significant bit-group in their IP address. As an example, network devices belonging to the first subnet can be identified by the network prefix 192.168.0/24 and the network devices belonging to the second subnet can be identified by the network prefix 192.168.1/24. It is understood that these network prefixes are only example, and that the first and second subnets could have different network prefixes. The servers within each of the two subnets can send packets to and receive packets from the example network 100 via switches S11 and S12.

The switches S11, S12, S21, and S22 can be interconnected via network links. At least one port of the switch S11 is coupled to at least one port of the switch S21. Furthermore, at least one port of the switch S11 is coupled to at least one port of the switch S22. Similarly, at least one port of the switch S12 is coupled to at least one port of the switch S21, and at least one port of the switch S12 is coupled to at least one port of the switch S22.

Figure 1B:
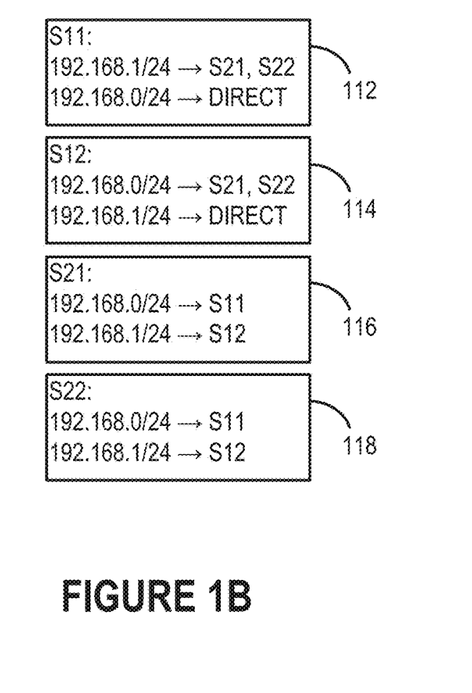
FIG. 1B shows example forwarding tables associated with switches within the network shown in FIG. 1A.

Switches S11, S12, S21, and S22 can utilize forwarding tables for forwarding packets between their respective network ports. FIG. 1B shows example forwarding tables associated with the switches within the network 100 shown in FIG. 1A. For example first, second, third, and fourth forwarding tables 112, 114, 116, and 118 correspond to the switches S11, S12, S21, and S22, respectively. The forwarding tables can include one or more forwarding rules. In some implementations, the forwarding rules can include a network address or a range of network addresses and a corresponding next-hop destination. In some implementations, the forwarding tables, as stored on the switch, may include identification of a network port communicably linked to the next-hop destination. When a switch receives a data packet, the switch can compare the destination address in the header of the data packet to the network addresses in the one or more forwarding rules stored in its forwarding table. If a matching network address is found, the switch sends the received data packet to the destination corresponding to the matched network address. For example, referring to the first forwarding table 112, if the switch S11 receives a data packet with a destination address within the subnet 192.168.1/24, the destination address of the data packet would match the forwarding rule 192.168.1/24→S21, S22. Thus, the switch S11 would forward the received data packet to the switches S21 or S22. As another example, if the destination address of the data packet were 192.168.0/24, then the destination address would match the forwarding rule 192.168.0/24→DIRECT. Here, DIRECT indicates that the packet is to be forwarded to the subnet 192.168.0/24. In a similar manner, switches S12, S21, and S22 can forward the received data packets based on the forwarding rules stored in their corresponding forwarding tables.

Figure 1C:
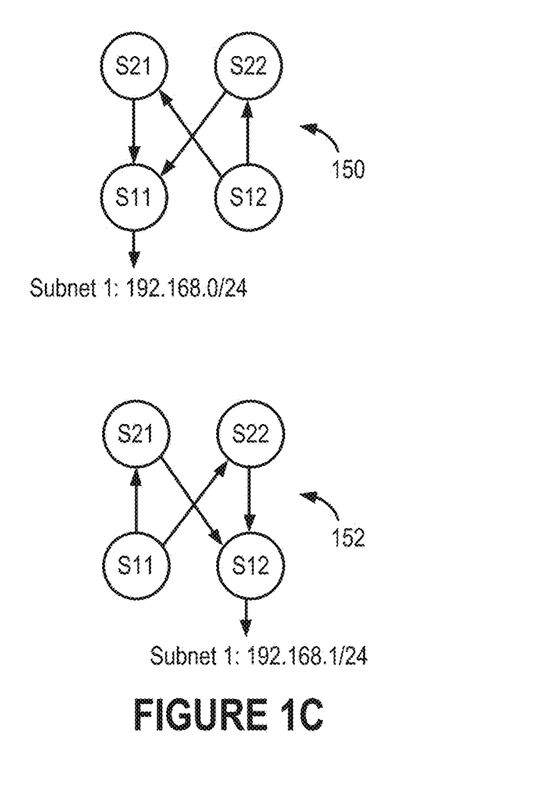
FIG. 1C shows two forwarding graphs corresponding to two subnets of the network shown in FIG. 1A.

In some implementations, the forwarding rules within various forwarding tables can be aggregated into one or more forwarding graphs. FIG. 1C shows a first forwarding graph 150 and a second forwarding graph 152 corresponding to the subnet-1 and subnet-2, respectively, of the network 100 shown in FIG. 1A. The forwarding graph can be a directed graph that describes the network behavior for the subnet it represents. For example, the first forwarding graph 150 describes the path that a packet destined the subnet 1 would take within the network 100. If a data packet were received at the switch S12, then the packet could be forwarded to the subnet-1 via switches S22 and S11 or via switches S21 and S11. Similarly, the second forwarding graph 152 describes the paths a packet destined to the subnet-2 could take within the network 100.

Errors in forwarding tables can cause anomalies within the network 100. In some implementations, the forwarding graphs, such as the ones shown in FIG. 1C, can aid in identifying anomalies within the network 100.

Figure 2A:
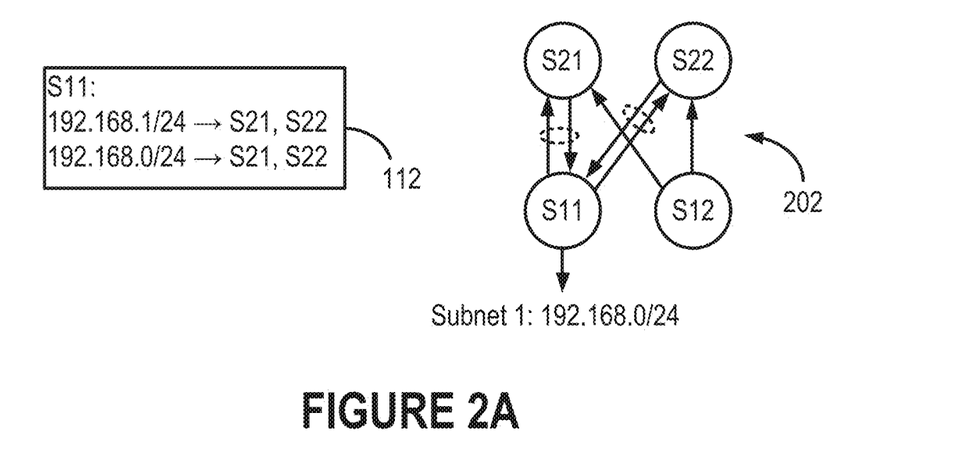
FIGS. 2A-2B show example forwarding graphs depicting network anomalies within the network shown in FIG. 1A.
Figure 2B:
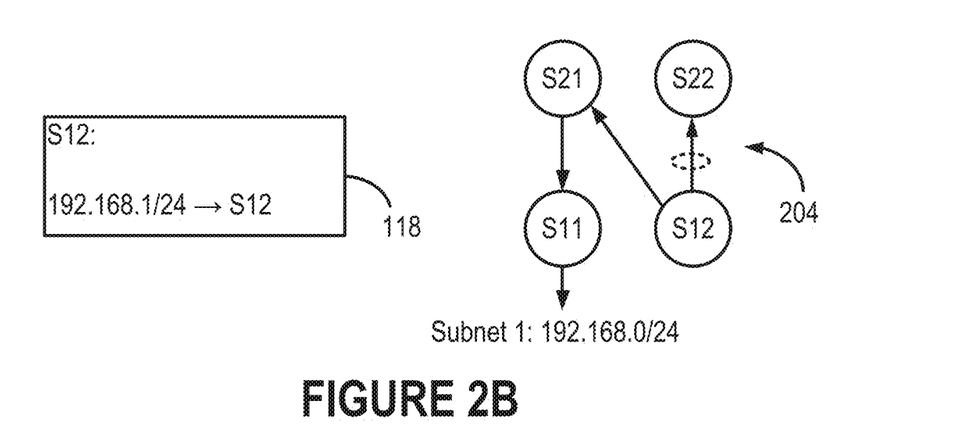

FIGS. 2A-2B show example forwarding graphs depicting network anomalies within the network 100 shown in FIG. 1A. In particular, FIG. 2A shows an example forwarding graph 202 depicting loops, and FIG. 2B shows an example forwarding graph 204 depicting black-holes.

In some instances, loops can be undesirably formed within the network 100 due to errors in the forwarding tables of one or more switches. In the example shown in FIG. 2A, loops can be formed within the network 100 when the forwarding table 112 for the switch S11 includes an erroneous forwarding rule. In particular, the forwarding rule: 192.168.0/24→DIRECT (as shown in FIG. 1B) may be erroneously changed to 192.168.0/24→S21, S22. Based on the changed forwarding rule 192.168.0/24→S21, S22, the switch S11 would undesirably forward packets destined for the subnet 192.168.0/24 to the switches S21 and S22, instead of forwarding those packets to the subnet 192.168.0/24. The forwarding tables of both switches S21 and S22 (as shown in FIG. 1B), in turn, instruct the switches to forward packets destined for the subnet 192.168.0/24 to the switch S11. Therefore, packets destined for the subnet 192.168.0/24 received by the switches S21 and S22 are sent back to the switch S11, which, in turn, again sends these packets to the switches S21 and S22. Thus, the packets destined for the subnet 192.168.0/24 are stuck in loops within the network 100—a first loop formed by switches S11 and S21, and a second loop formed by switches S11 and S22—and are never transmitted to their intended destination of the subnet-1 192.168.0/24.

In some instances, black-holes can be undesirably formed within the network 100 also due to errors in the forwarding tables for one or more switches. In the example shown in FIG. 2B, black-holes can be formed within the network 100. Black-holes can refer to locations within the network 100 where packets are unintentionally discarded or dropped. In one example, black-hole can be formed within the network 100 if the forwarding rule: 192.168.0/24→S11 in the forwarding table 118 for the switch S22 is accidentally deleted. As a result, when the switch S22 receives packets destined for the subnet 192.168.0/24, based on the lack of any entry for the subnet 192.168.0/24 in the forwarding table 118, the switch S22 may drop the received packets. Thus, packets destined to the subnet 192.168.0/24 received by the switch S22 may not be delivered to their intended destination.

For reliable operation, prompt detection of network anomalies within the network 100 is needed. While the example network 100 discussed above is relatively small, some networks, such as in large data centers, may include hundreds or thousands of switches having millions of forwarding rules. FIGS. 3-7 below discuss a high performance network verification system for detecting network anomalies within large networks. The network verification system can also scale substantially linearly with the size of the network being analyzed.

Figure 3:
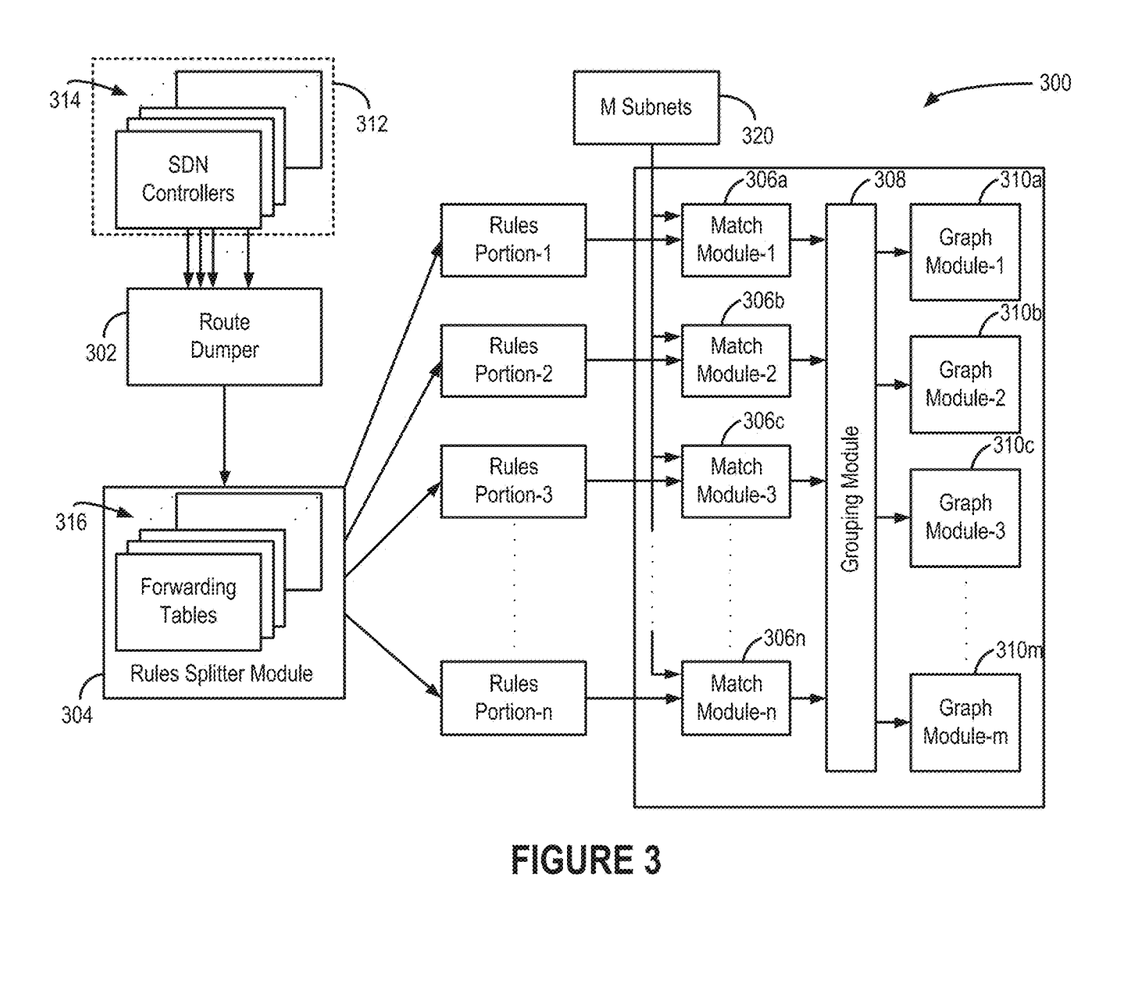
FIG. 3 shows a functional block diagram of a network verification system.

FIG. 3 shows a functional block diagram of a network verification system (NVS) 300. In particular, the NVS 300 can be utilized for verifying a network for anomalies or errors. The NVS 300 can include a route dumper 302, a rules splitting module 304, N match modules 306a-306n, a grouping module 308, and M graphing modules 310a-310m. The route dumper 302 can request forwarding and routing information from network devices, the rules splitting module 304 can split the forwarding and routing information received by the route dumper 302 into N portions, each of the N match modules 306a-306n can identify forwarding rules within one of the N portions that match a list of subnets, the grouping module 308 can form M groups of forwarding rules, where each group includes forwarding rules that match the same Mth subnet, and each of the M graphing modules 310a-310n can form directed forwarding graphs for one of the M groups of forwarding rules and identify network anomalies and errors. Each of the modules identified in the NVS 300 can be software modules, hardware modules, or a combination of software/hardware modules.

In some implementations, the various modules within the NVS 300 can be implemented on a single server. In some other implementations, the various modules of the NVS 300 can be implemented on several severs running in parallel. As will be discussed below, by implementing the NVS 300 on parallel servers, the NVS 300 can quickly verify large networks for anomalies or errors. The operation of the NVS 300, and the components thereof, are described below with the aid of FIGS. 4 and 5A-5E, where FIG. 4 shows a flow diagram for an example process used for verifying networks and where FIGS. 5A-5E shows example results of the execution of various stages of the process shown in FIG. 4 in relation to an example network.

Figure 4:
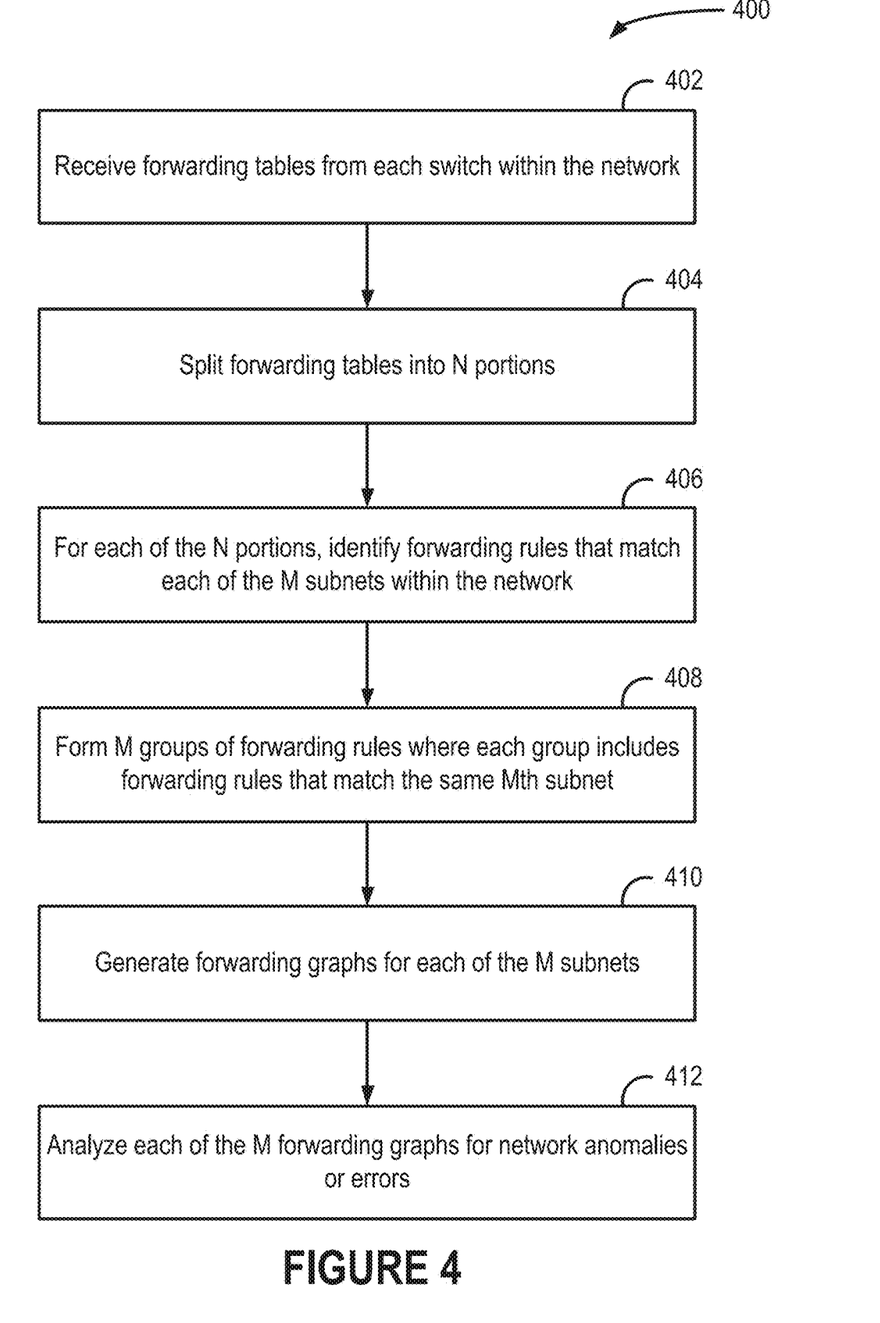
FIG. 4 shows an example flow diagram of a process executed by the network verification system shown in FIG. 3.

FIG. 4 shows an example flow diagram of a process 400 executed by the NVS 300. In particular, the process 400 includes receiving forwarding tables from each switch within the network (stage 402), splitting the forwarding tables into N portions (stage 404), for each of the N portions, identifying forwarding rules that match each of the M subnets within the network (stage 406), forming M groups of forwarding rules, where each group includes forwarding rules that match the same Mth subnet (stage 408), generating forwarding graphs for each of the M subnets (stage 410), and analyzing each of the M forwarding graphs for network anomalies or errors (stage 412).

The process 400 includes receiving forwarding tables from each switch within the network (stage 402). The route dumper 302 can request forwarding tables, routing tables, the forwarding information base (FIB), the routing information base (RIB), and other routing and forwarding information from one or more switches in a network. In some implementations, the network may be configured using software defined networks (SDNs), and may include a number of SDN controllers controlling routing and forwarding in their respective SDN. In such implementations, the route dumper 302 can request forwarding tables from the SDN controllers. For example, as shown in FIG. 3, the network 312 includes a plurality of SDN controllers 314. The route dumper 302 requests, and in response receives, forwarding tables from the plurality of SDN controllers 314. In some implementations, the route dumper 302 receives forwarding tables from both the SDN controllers 314 and network switches within the SDN.

Figures 5A, 5B, 5C:
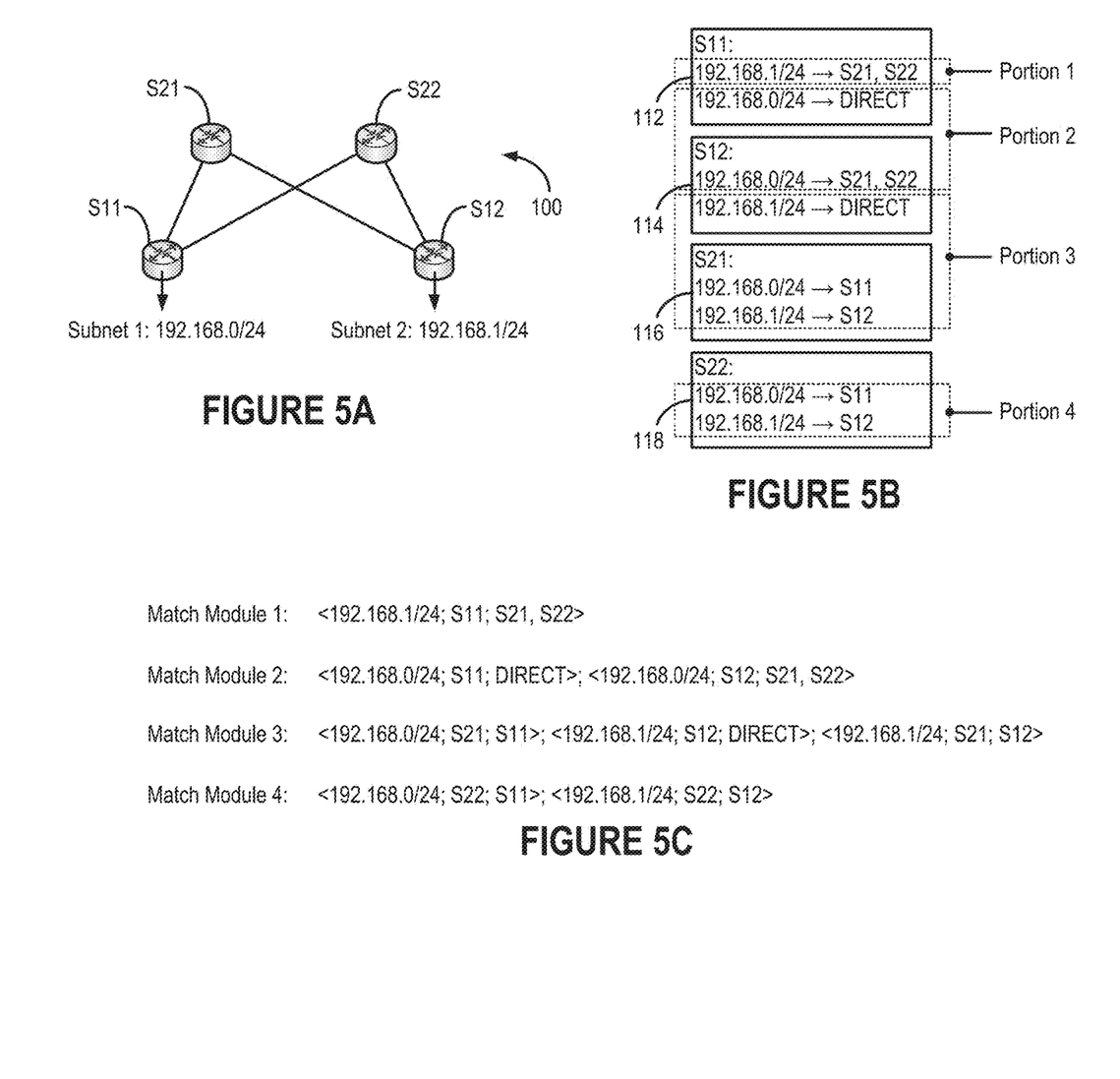
FIGS. 5A-5E shows example results at various stages of execution of the process shown in FIG. 4.

Referring to FIGS. 5A and 5B, the NVS 300 can verify network 100 for anomalies and errors. As discussed above in relation to FIG. 1A-1C, the network 100 includes four switches S11, S12, S21, and S22. The route dumper 302 can request the forwarding tables from each of the four switches within the network 100. In response to the request, the route dumper 302 can receive forwarding tables 112-118 form the four switches, as shown in FIG. 5B.

The received forwarding tables can include forwarding rules that specify the manner in which incoming packets are to be forwarded within the network. In some implementations, the route dumper 302 can process each forwarding rule prior to being processed by the rules splitting module 304. For example, the route dumper 302 can be configured to examine the forwarding rules and identify values associated with one or more following forwarding rule attributes: SWITCH (unique ID of the switch from where the particular forwarding rule is received), IP (the destination IP address or address range) MASK_LEN (the destination address prefix), NEXTHOPS (a list of port names), and PRIORITY (an integer field serving as a tie-breaker in longest prefix matching during graphing). The route dumper 302 can communicate forwarding rule attributes along with the forwarding tables including forwarding rules to the splitting module 304.

The process 400 also includes splitting the forwarding tables into N portions (stage 404). The splitting of the forwarding tables into N portions can be carried out by the splitting module 304. As shown in FIG. 3, the splitting module 304 receives a plurality of forwarding tables 316 from the route dumper 302. The splitting module 304 can extract and aggregate the forwarding rules included in the received forwarding tables 316. The splitting module 304 can then split the forwarding rules into N portions of forwarding rules. In some implementations, each of the N portions may include equal number of forwarding rules. In some other implementations, the N portions may include unequal number of forwarding rules.

One example of splitting the forwarding rules into N portions is shown in FIG. 5B. The forwarding rules within the forwarding tables 112-118 can be split into four portions. Portion-1 includes one forwarding rule from the first forwarding table 112, Portion-2 includes one forwarding rule each form the first and the second forwarding tables 112 and 114, Portion-3 includes one forwarding rule from the second forwarding table 114 and two forwarding rules from the third forwarding table 116, and Portion-4 includes two forwarding rules from the fourth forwarding table 118. The splitting of the forwarding rules into four portions is merely an example, and it should be understood that the splitting module 304 can be configured to split the forwarding rules into any number of portions.

In some implementations, where the received forwarding rules include hundreds and thousands of forwarding rules, the splitting module 304 may split the forwarding rules into a larger number of portions. In some implementations, the number of portions and the number of forwarding rules within each portion can be a function of the processing capacities of the N match modules 306a-306n. For example, if each of the N match modules 306a-306n can process a maximum of x forwarding rules, then the splitting module 304 can be configured to split the forwarding rules into N portions where any of the N portions include no more than x forwarding rules. In some implementations, the splitting module 304 can randomly split the received forwarding rules into N portions. In some other implementations, the splitting module 304 can split the forwarding rules into N portions in the order in which they are received from the route dumper 302.

The process 400 further includes for each of the N portions, identifying forwarding rules that match each of the M subnets within the network (stage 406). As shown in FIG. 3, each of the N portions is input to one of N match modules 306a-306n. In addition, each of the N match modules 306a-306n receives a list of M subnets 320 within the network. In some implementations, the list of M subnets 320 can be determined by the NVS 300 by examining the network, while in some implementations, the list of M subnets 320 may be provided by the network administrator.

Each of the N match modules 306a-306n can be configured to identify the forwarding rules within the corresponding received portion of forwarding rules that match each of the M subnets. Specifically, each forwarding rule is compared to all of the M subnets to determine whether the prefix of any of the M subnets falls within the forwarding rule's prefix. For example, if the destination address for a forwarding rule is 192.168.0.1 and one of the M subnets is 192.168.0/24, then the destination address is included within or "matches" the subnet. On the other hand if the destination address for a forwarding rule is 192.168.1.1, then this destination address is not included in the subnet 192.168.0/24. Therefore, that forwarding rule does not match the subnet. If a match is found, the match modules 306a-306n output the matched subnet prefix as an intermediate key paired with one or more attribute associated with the forwarding rule recorded by the route dumper 302. For example, the match module 306a-306n upon identifying a match can output <SUBNET, SWITCH, MASK_LEN, NEXTHOPS, PRIORITY>, where the SUBNET is the intermediate key that indicates the subnet to which that forwarding rule matches, while the remaining arguments are forwarding rule attributes, which have been discussed above.

In some implementations, to improve the speed at which the N match modules 306a-306n can identify matching forwarding rules, the M subnets 320 can be provided to each of the N match modules 306a-306n in the form of a trie data structure. In some such implementations, each of the N match modules 306a-306n can match each forwarding rule with the subnet trie to determine the subnets within the trie to which the forwarding rule matches. A match can be identified by searching for the smallest matching trie node (say node X) that is bigger or equal to the prefix of the forwarding rule (say node A). Reference to "small" and "big" refer to the lexicographical order (and not address space size). If node X exists, then all of its non-empty descendants within the subnet trie (including node X itself) can be identified as matching subnets. Otherwise, it can be concluded that there is no matching subnet in the trie.

Figure 6:
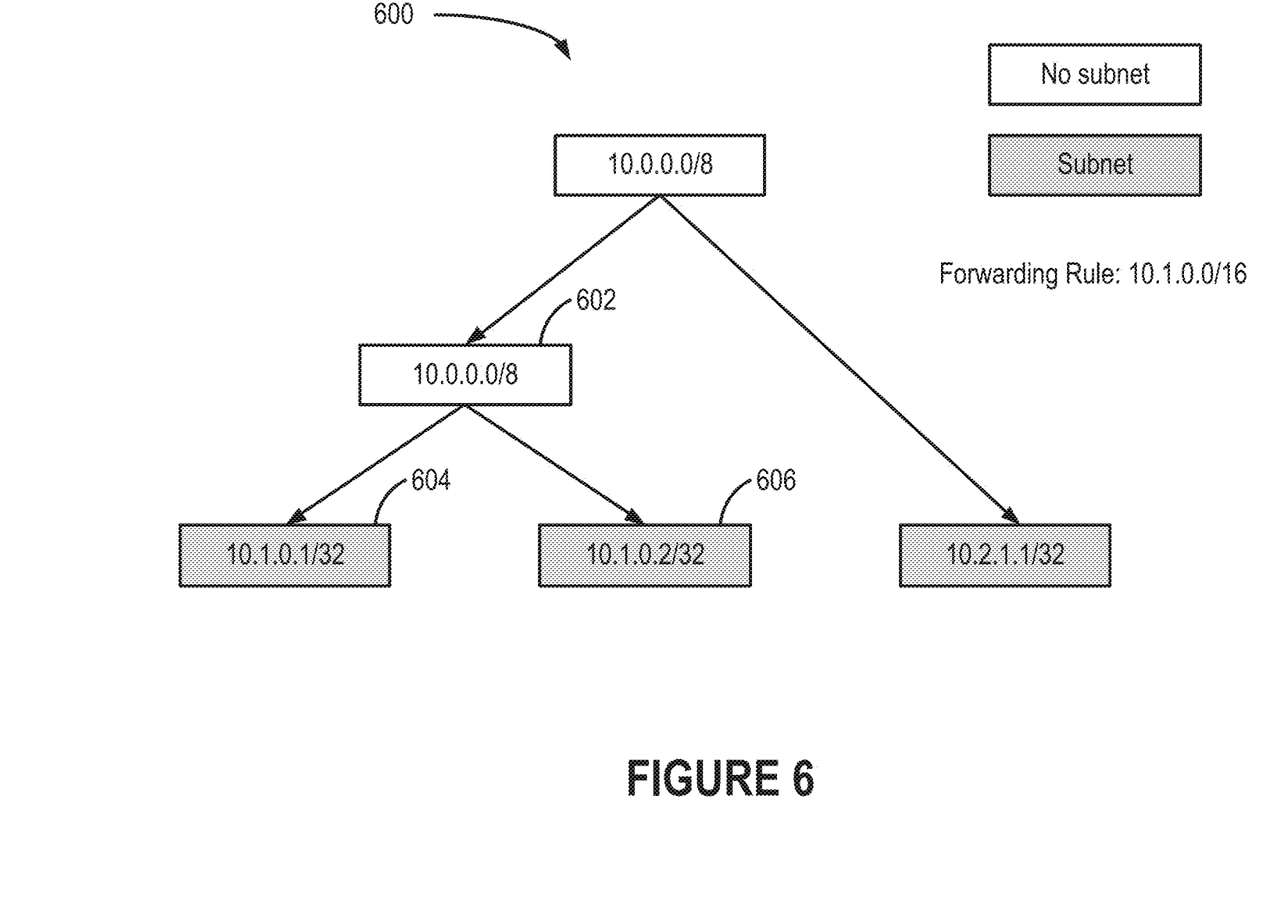
FIG. 6 shows an example subnet trie for determining whether forwarding rules match one or more subnets within the network.

FIG. 6 shows an example subnet trie for determining whether forwarding rules match one or more subnets within the network. In particular, FIG. 6 shows an example subnet trie 600 used for determining matching subnets for the forwarding rule including the destination address 10.1.0.0/16. The node 602 (node X) is the smallest matching trie node bigger than the forwarding rule address 10.1.0.0/16. Thus, as discussed above, the descendants of the node 602 would represent the subnets that match the forwarding rule. Thus, the subnets 10.1.0.1/32 and 10.1.0.2/32 represented by nodes 604 and 606, respectively, match the forwarding rule that includes the destination address 10.1.0.0/16. Specifically, the subnets 10.1.0.1/32 and 10.1.0.2/32 fall within the prefix 10.1.0.0/16. The resulting output of the match module would then include the matched SUBNET in addition to any other forwarding rule attributes such as SWITCH, MASK_LEN, NEXTHOPS, and PRIORITY discussed above.

FIG. 5C shows example outputs of four match modules used for identifying forwarding rules that match the two subnets 192.168.0/24 and 192.168.1/24. Specifically, the four match modules, upon identifying a match, output <SUBNET, SWITCH, NEXTHOP>. While the outputs shown in FIG. 5C do not include attributes MASK_LEN and PRIORITY, it is understood that values for these attributes can be readily included. The match module 1, which processes the Portion-1, compares the destination address 192.168.1/24 in the forwarding rule 192.168.1/24→S21, S22 to the two subnets: 192.168.0/24 and 192.168.1/24. As the destination address 192.168.1/24 matches the subnet 192.168.1/24, the match module 1 outputs <192.168.1/24; S11; S21, S22>, where 192.168.1/24 represents the SUBNET, S11 represents the SWITCH, and S21, S22 represent the NEXTHOPS. In a similar manner, the match module 2, which processes Portion-2, outputs <192.168.0/24; S11; DIRECT>; <192.168.0/24; S12; S21, S22>. The outputs of the remaining two match modules are also shown in FIG. 5C.

The process 400 further includes forming M groups of forwarding rules, where each group includes forwarding rules that match the same Mth subnet (stage 408). The grouping module 308 can receive the outputs of all N match modules 306a-306n. Outputs that have the same value for the SUBNET attribute are grouped together in one group. As there are M subnets in the network, the grouping module 308 can form M groups. As the outputs of the N match modules 306a-306n include forwarding rules, each of the M groups can be considered to include forwarding rules associated with the same subnet. Once the M groups are formed, the each of the M groups is presented to one of M graphing modules 310a-310m.

Figure 5D:
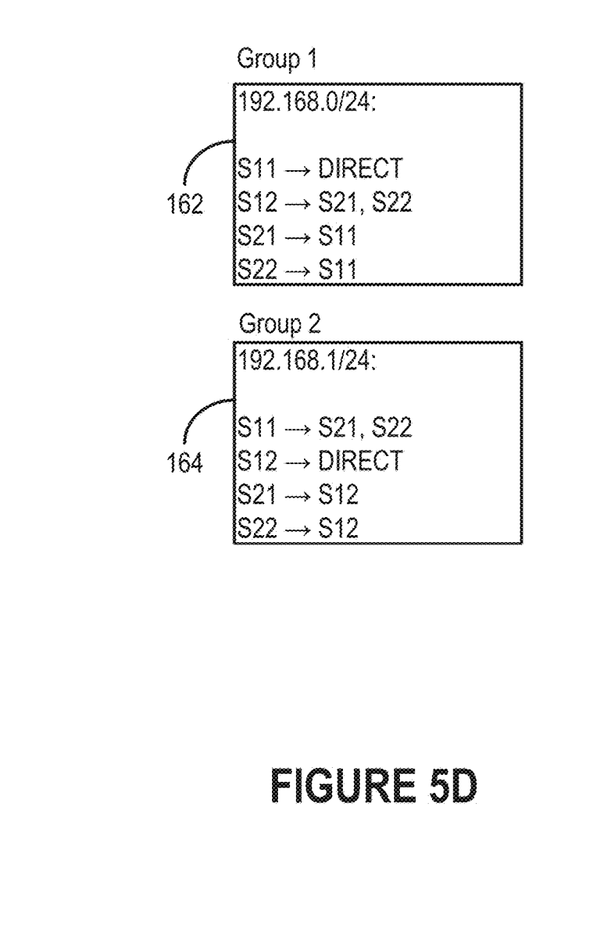

FIG. 5D shows one example output of the grouping module 308. FIG. 5D shows two groups Group-1 162 and Group-2 164 corresponding to the two subnets 192.168.0/24 and 192.168.1/24, respectively. The grouping module 308 can receive the outputs of the four match modules shown in FIG. 5C and group the outputs according to the value of the SUBNET attribute. Within each group, the grouping module can list the SWITCH and the NEXTHOPS values of each of the outputs within that group. For example, Group-1 162 includes the forwarding rule S11→DIRECT corresponding to the first output of the match module-2 shown in FIG. 5C. Similarly, Group-2 164 includes the forwarding rule S11→S21, S22 corresponding to the third output of the match module-3 shown in FIG. 5C.

The process 400 further includes generating forwarding graphs for each of the M subnets (stage 410). As discussed above, each of the M graphing modules 310a-310m receives one group of forwarding rules corresponding to one subnet from the grouping module 308. The forwarding rules received by the graphing modules 310a-310m can include a set of values for the attributes such as SWITCH, MASK_LEN, NEXTHOPS, and PRIORITY. In some implementations, each of the M graphing modules 310a-310m can select the forwarding rules for the same SWITCH value. The order in which the forwarding rules are selected can be based on the value of their respective PRIORITY attribute. For example, in some implementations, the forwarding rule having the highest value for the PRIORITY attribute could be selected first. In some implementations, the PRIORITY values of two or more forwarding rules may be the same. In some such implementations, the forwarding rule with the larger value for the MASK_LEN can be selected first.

In some implementations, each of the M graphing modules 310a-310m can construct a directed forwarding graph corresponding to one of the M subnets. In some implementations, tools such as NetworkX (Python), igraph, boost graph library, etc., can be utilized by the M graphing modules 310a-310m for constructing directed forwarding graphs. Each forwarding graph includes a plurality of vertices, where each vertex corresponds to a switch, at least one rule in the forwarding table of which matched the subnet. In addition, each edge between the vertices represents a possible link a packet can traverse.

Figure 5E:
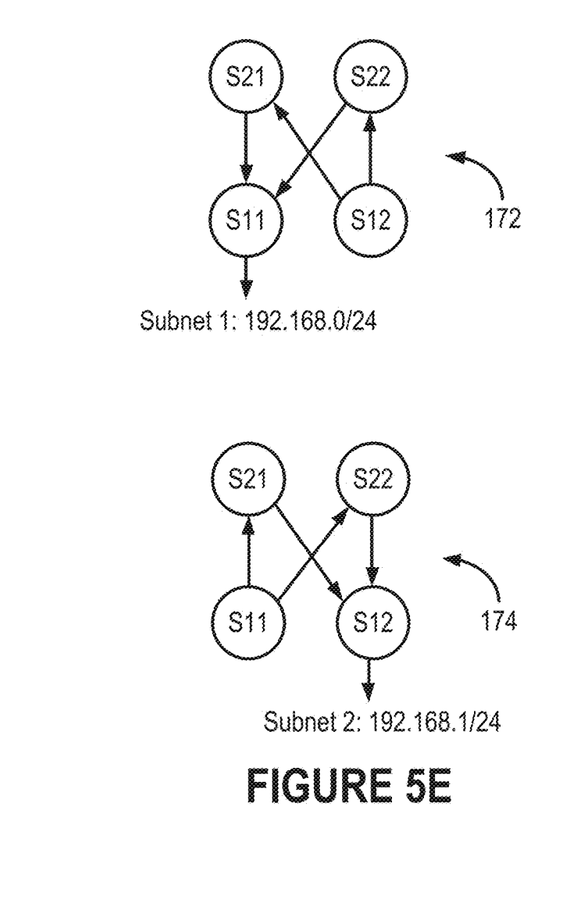

FIG. 5E shows example forwarding graphs generated for the two subnets in the example network shown in FIG. 5A. In particular, a first forwarding graph 172 is generated using the forwarding rules included in Group-1 162 (shown in FIG. 5D) for the first subnet 192.168.0/24 and a second forwarding graph 174 is generated using the forwarding rules included in Group-2 164 for the second subnet 192.168.1/24.

The process 400 further includes analyzing each of the M forwarding graphs for network anomalies or errors (stage 412). The M graphing modules 310a-310m in addition to generating directed forwarding graphs associated with the M subnets, can also detect anomalies or errors within the subnet. In some implementations, the M graphing modules 310a-310m can communicate the detected anomalies and errors in the network to a network administration system. As mentioned above, the forwarding graphs can include vertices and edges, where the vertices can correspond to switches having one or more forwarding rules matching the subnet and the edges can represent a possible network link a packet can traverse. In some implementations, detecting network anomalies or errors can be based on determining certain properties of the directed forwarding graphs.

In some implementations, the graphing modules 310a-310m can carry out reachability analysis for their respective directed forwarding graphs. Reachability analysis can aid in determining whether the subnet represented by the directed forwarding graph can be reached from any switch in the network. In some implementations, reachability analysis can include carrying out a reverse depth-first-search (DFS) starting from the vertex representing the switch closest to the subnet, and checking if the resulting vertex set contains vertices that correspond to all switches within the network.

In some implementations, the graphing modules 310a-310m can carry out loop detection for their respective directed forwarding graphs. A loop in a graph can be equivalent to at least one strongly connected component in the directed forwarding graph. For example, two vertices S11 and S21 can belong to a strongly connected component if there is a path from S11 to S21 and a path from S21 to S11 (as shown, for example, in FIG. 2A). If a loop is discovered, the graphing modules 310a-310m can conclude that an undesired network loop exists between switches S11 and S21. In some implementations, the graphing modules 310a-310m can employ Tarjan's algorithm (disclosed, for example, in Tarjan, R. E. (1972), "Depth-first search and linear graph algorithms", Society for Industrial and Applied Mathematics (SIAM) Journal on Computing 1 (2): 146-160) for detecting strongly connected components within the directed forwarding graphs.

In some implementations, the graphing modules 310a-310m can carry out black-hole detection for their respective directed forwarding graphs. A switch can be considered to be a black-hole for a subnet if the switch does not have a matching forwarding rule for the subnet in its forwarding table (as shown, for example, in FIG. 2B). In such cases, when the switch receives a packet destined for the subnet, the packet is dropped. In some implementations, black-holes can be legitimate. For example, in instances where a particular switch is a last hop for the subnet or if there is an explicit drop rule implemented by the network administrator that drops packets destined for the subnet. The graphing modules 310a-310m can take into account such legitimate black-holes during black-hole detection. In some implementations, the black-holes can be detected by determining those vertices of the directed forwarding graph that have a zero out-degree. If a zero-out degree is detected for a vertex, then the corresponding switch can be flagged as a black-hole for the subnet.

In some implementations, the graphing modules 310a-310m can carry out waypoint-routing verification for their respective directed forwarding graphs. In some implementations, a network can be configured to route traffic destined to a certain subnet through a way-point, such as a firewall of a middlebox. In such implementations, the graphing modules 310a-310m can first check whether a waypoint exists on all forwarding paths. Specifically, the waypoint and its associated links can be removed and the remaining directed forwarding graph can be reverse depth-first-searched starting from the vertex corresponding to the subnet's first-hop switch and ensuring that no edge switches appear in the result.

Referring again to FIG. 3, the route dumper 302, as discussed above, can receive and process forwarding tables from various switches and controllers within a network. In some implementations, the forwarding rules can also include ingress port information. In some such implementations, the forwarding of a packet is dependent not only on the destination address of the packet, but also on the ingress port of the packet. For example, a forwarding rule may only apply to packets entering the switch from a particular port. In some implementations, including another variable such as the ingress port can complicate the directed forwarding graphs generated by the graphing modules 310a-310m. To simplify the directed forwarding graphs, the route dumper 302, upon receiving forwarding rules that include ingress ports, can logically split the switch from which the forwarding rule is received, into multiple logical switches. Each logical switch is given a new name and contains the rules depending on one ingress port. The forwarding rules with the same ingress port form the original switch can then be associated with the logical switch. Subsequently, the forwarding rules in the upstream switches are updated such that the NEXTHOPS, wherever appropriate, include the identity of the logical switch. In this manner, each of split logical switches no longer includes forwarding rules dependent upon the ingress ports.

In some implementations, multiple forwarding tables may be associated with a single switch in the network. In some such implementations, the multiple forwarding tables may be linked or chained together by arbitrary matching forwarding rules, in a technique typically known as "Virtual Routing and Forwarding" (VRF). In VRF, incoming packets are matched with a VRF Override forwarding table to determine whether that forwarding table includes a forwarding rule for the destination address of the incoming packet. If no forwarding rule is found, then the packet is matched with a series of additional VRF forwarding tables. If still no matching forwarding rule is found, the packet is forwarded based on a VRF default forwarding table. The route dumper 302 can map multiple forwarding tables in a switch onto multiple logical switches, each logical switch being associated with one of the multiple forwarding tables. The logical switches can be configured such that logical switches are directly linked. Furthermore, rules chaining VRFs are added as lower priority rules in the logical switch's forwarding table. As a result, if the destination address of an incoming packet does not match a forwarding table of one logical switch, the packet can be compared to the forwarding table of the next switch. The route dumper 302 can forward the multiple forwarding tables associated with the multiple logical switches to the rules splitter module 304, where the forwarding tables can be split in a manner similar to that described above.

In some implementation, the NVS 300 may have to re-execute a majority of the stages of the process 400 shown in FIG. 4, each time a new subnet is received at the NVS 300 or updated forwarding rules are received by the NVS 300. In other implementations, the NVS 300 can be configured for incremental updates that do not need the NVS 300 to re-execute the entire process 400. In some implementations, when a new forwarding rule is received, the splitting module 304 can split the new forwarding rule in a separate portion and the NVS 300 can deploy an additional match module 306a-306n for processing the separate portion to identify matching subnets. Thus, the previously split forwarding rules are not reprocessed and re-split by the splitting module 304. The additional match module 306a-306n can identify the subnets that match the new forwarding rule. The additional match module 306a-306n can generate outputs based on the matched subnets. The outputs of the additional match module 306a-306n can be sent to the appropriate graphing modules 310a-310m that are assigned to generate the directed forwarding graph for the subnets identified in the outputs. The graphing modules 310a-310m can store the previously generated directed forwarding graphs and the associated forwarding rules. Upon receiving an updated forwarding rule, a graphing module 310a-310m can update the directed forwarding graph based on the updated forwarding rule. The updated directed forwarding graph can then be analyzed for network anomalies or errors. In some implementations, the updated directed forwarding graphs can be stored in memory. The directed forwarding graphs for subnets not identified by the match modules 306a-306n are not affected.

As only the subnets affected by the new forwarding rule are updated, the directed forwarding graphs of only the affected subnets need to be re-analyzed for network anomalies or errors. Thus, the network anomalies and errors as a result of new forwarding rules can be quickly determined.

In some implementations, network anomalies can also be checked incrementally as the forwarding rule update may affect only a small portion of the direct forwarding graph. For example, for loop detection in an updated directed forwarding graph in which a new edge has been added, a DFS can be started from the new edges destination node. The DFS would typically not traverse the entire graph, but would be localized near the new edge. As a result, only a portion of the directed forwarding graph can be incrementally updated, without regenerating an entire directed forwarding graph.

In some implementations, several functional modules within the NVS 300 can be executed in parallel. For example, each of the N match modules 306a-306n operate on independent sets of data, and therefore, the N match modules 306a-306n can be operated in parallel. Similarly, the M graphing modules 310a-310m also operate on independent sets of data (M groups of forwarding rules matching M separate subnets). Therefore, the M graphing modules 310a-310m can also be operated in parallel. Operating these modules in parallel can improve the performance of the NVS 300.

The NVS 300 can also be readily scaled with the increase in the size of the network being analyzed. For example, if the number of forwarding rules increases, the NVS 300 can assign additional computing resources (such as processors, processing threads, servers, etc.) to implement additional match modules 306a-306n. Similarly, if the number of subnets within the network increases, the NVS 300 can assign additional computing resources to implement additional graphing modules 310a-310m. Generally, the increase in the computing resources is a substantially linear function of the increase in the size of the network.

In some implementations, a MapReduce system can be employed for implementing the NVS 300. In particular, the parallel processing functionality offered by the MapReduce system can be used operate the N match modules 306a-306n as well as the M graphing modules 310a-310m in parallel. In some implementations, N mappers of the MapReduce system can be employed to implement the N match modules 306a-306n. The N mappers can match the received forwarding rules with the M subnets to determine matches. For each match identified, the N mappers can output <KEY, VALUE> pairs, where the KEY can take values of the matched subnets, while the VALUE can include several attributes of the forwarding rules such as SWITCH, MASK_LEN, NEXTHOPS, and PRIORITY, which have been discussed above.

In some implementations, a shuffler function of the MapReduce system can be utilized for implementing the grouping module 308 of the NVS 300. A shuffler function of the MapReduce system shuffles outputs from the N mappers by sorting according to the KEY. After shuffling, the VALUEs of the outputs can be grouped as VALUES=[VALUE1, VALUE2, . . . ] where each of VALUE1, VALUE2, . . . corresponds to the same KEY (i.e., subnet).

In some implementations, the M graphing modules 310a-310m can be implemented using M reducers of the MapReduce system. In some implementations, each of the M reducers corresponds to one of M subnets identified by the NVS 300. Each of the M reducers can receive a KEY identifying a subnet along with an associated set of VALUES that represent various forwarding rules that have been identified by the N mappers as matching the subnet. The M reducers can use the forwarding rules to generate and analyze direct forwarding graphs associated with M subnets. As discussed above, network anomalies and errors can be detected within a subnet by analyzing certain graph properties of the direct forwarding graph corresponding to the subnet. Each reducer can analyze the direct forwarding graph and report any detected anomalies or errors such as loops and black-holes.

Figure 7:
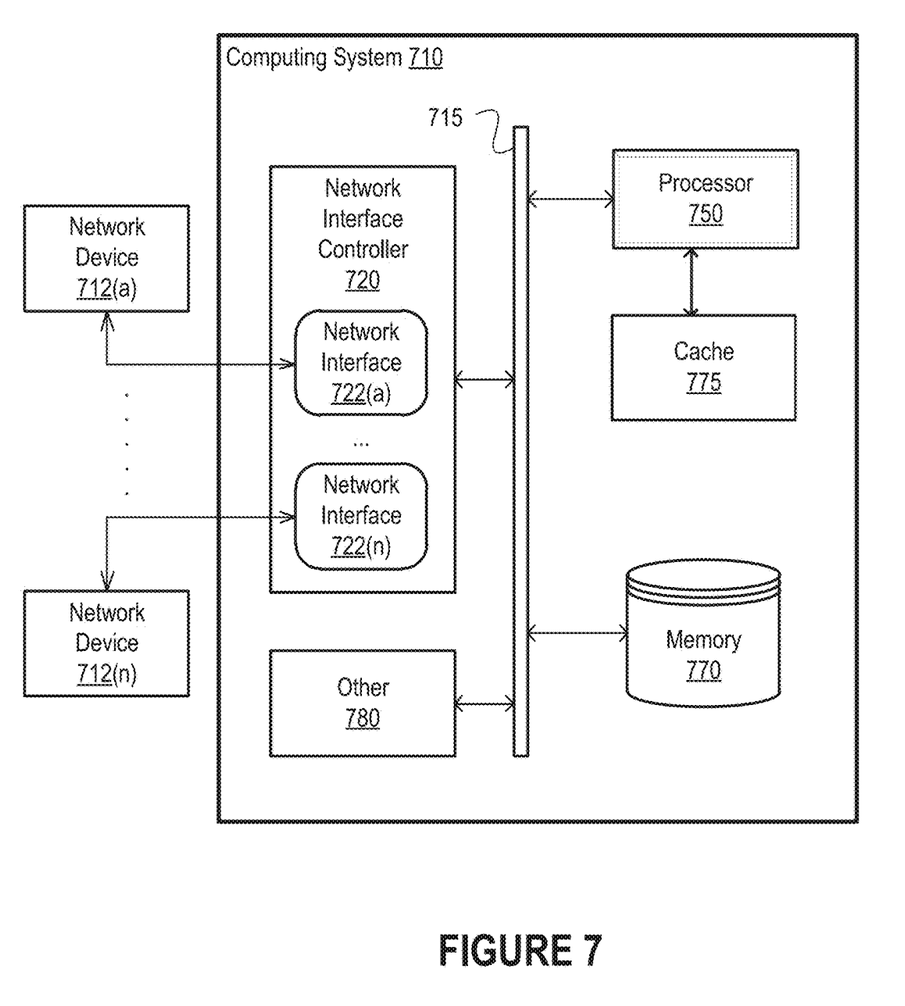
FIG. 7 shows a block diagram of an example computing system.

FIG. 7 shows a block diagram of an example computing system 710. In some implementations, the computing system 710 may be utilized in implementing the NVS 300 shown in FIG. 3. In some other implementations, a cluster of computing systems 710 can by utilized for implementing one or more modules of the NVS 300. For example, N computing systems 710 can be utilized to run in parallel to implement N match modules 306a-306n of the NVS 300. In some other implementations, M computing systems 710 can be utilized to run in parallel to implement M graphing modules 310a-310m. In some implementations, one or more computing systems 710 can be utilized to implement the route dumper 302 and the grouping module 308 of the NVS 300. In some implementations, one or more computing systems 710 can be utilized for implementing a MapReduce system, which, in turn, can be utilized for implementing the NVS 300. In some implementations, one or more computing systems 710 can be utilized to execute one or more stages of the process 400 shown in FIG. 4.

In broad overview, the computing system 710 includes at least one processor 750 for performing actions in accordance with instructions and one or more memory devices 770 or 775 for storing instructions and data. The illustrated example computing system 710 includes one or more processors 750 in communication, via a bus 715, with at least one network interface controller 720 with network interface ports 722(a-n) connecting to other computing devices 712(a-n), memory 770, and any other devices 780, e.g., an I/O interface. Generally, a processor 750 will execute instructions received from memory. The processor 750 illustrated incorporates, or is directly connected to, cache memory 775.

In more detail, the processor 750 may be any logic circuitry that processes instructions, e.g., instructions fetched from the memory 770 or cache 775. In many embodiments, the processor 750 is a microprocessor unit or special purpose processor. The computing device 710 may be based on any processor, or set of processors, capable of operating as described herein. In some implementations, the processor 750 can be capable of executing the process 400 shown in FIG. 4. The processor 750 may be a single core or multi-core processor. The processor 750 may be multiple processors. In some implementations, the processor 750 can be configured to run multi-threaded operations. The processor 750 can be utilized for executing several modules of the NVS 300 in parallel.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 710 may have any number of memory devices 770. In some implementations, the memory 770 can include instructions corresponding to the process 400 shown in FIG. 4. In some implementations, the memory 770 can be utilized for storing M direct forwarding graphs generated by M graphing modules 310a-310m shown in FIG. 3.

The cache memory 775 is generally a form of computer memory placed in close proximity to the processor 750 for fast read times. In some implementations, the cache memory 775 is part of, or on the same chip as, the processor 750. In some implementations, there are multiple levels of cache 775, e.g., L2 and L3 cache layers.

The network interface controller 720 manages data exchanges via the network interfaces 722(a-n) (also referred to as network interface ports). The network interface controller 720 handles the physical and data link layers of the OSI model for network communication. In some implementations, some of the network interface controller's tasks are handled by the processor 750. In some implementations, the network interface controller 720 is part of the processor 750. In some implementations, a computing system 710 has multiple network interface controllers 720. The network interfaces 722(a-n) are connection points for physical network links. In some implementations, the network interface controller 720 supports wireless network connections and an interface port 722 is a wireless receiver/transmitter. Generally, a computing device 710 exchanges data with other computing devices 712(a-n) via physical or wireless links to a network interfaces 722(a-n). In some implementations, the network interface controller 720 implements a network protocol such as Ethernet. In some implementations, one or more of the network interfaces 722(a-n) can be utilized for implementing one or more of ports in any one of the switches S11, S12, S21, and S22 shown in FIG. 1A.

The other computing devices 712(a-n) are connected to the computing device 710 via a network interface port 722. The other computing devices 712(a-n) may be peer computing devices, network devices, or any other computing device with network functionality. For example, a first computing device 712(a) may be a network device such as a hub, a bridge, a switch, or a router, connecting the computing device 710 to a data network such as the Internet. In some implementations, the other computing devices can be utilized to implement switches S11, S12, S21, and S22 shown in FIG. 1A.

The other devices 780 may include an I/O interface, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 710 includes an additional device 780 such as a co-processor, e.g., a math co-processor can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for analyzing a network for abnormalities, comprising:
    receiving routing information from a plurality of switches within a network, the routing information including forwarding tables that list forwarding rules for forwarding packets within the network;
    splitting the received routing information into N portions;
    processing each of the N portions by identifying forwarding rules that pertain to each of M subnets belonging to the network, wherein a forwarding rule pertains to an Mth subnet if a prefix representing the Mth subnet can be fully included within a prefix associated with the forwarding rule;
    forming M groups of forwarding rules such that each group only includes forwarding rules that pertain to the same Mth subnet;
    generating M forwarding graphs for the M subnets, each of the M forwarding graphs being generated using the corresponding Mth group of forwarding rules;
    identifying graph properties representative of network abnormalities in any of the M forwarding graphs; and
    indicating network abnormalities identified in any of the M forwarding graphs, wherein M and N are integers greater than 1.

2. The method of claim 1, wherein processing each of the N portions of the routing information includes processing the N portions of the routing information in parallel.

3. The method of claim 1, wherein generating the M forwarding graphs for the M subnets includes generating the M forwarding graphs in parallel.

4. The method of claim 1, further comprising:
    determining the M subnets from the routing information.

5. The method of claim 4, further comprising:
    storing the M subnets in the form of a trie data structure, and
    identifying forwarding rules that pertain to each of the M subnets by traversing the trie to identify that the prefix representing the Mth subnet is fully included within the prefix associated with the forwarding rule.

6. The method of claim 1, wherein the forwarding rules include a network address and at least one of a next hop switch identifier, a local switch identifier, and a priority.

7. The method of claim 2, wherein processing the N portions of the routing information in parallel includes utilizing one of N mapping functions of a MapReduce system for processing one of the N portions of the routing information.

8. The method of claim 3, wherein generating the M forwarding graphs in parallel includes utilizing one of M reducing functions of a MapReduce system for generating one of the M forwarding graphs.

9. The method of claim 1, wherein identifying the graph properties representative of network abnormalities in any of the M forwarding graphs includes identifying at least one of strongly connected components and zero-out degree within any of the M forwarding graphs.

10. A system for detecting network anomalies within a network comprising one or more processors executing:
    a route dumper module configured to receive routing information from a plurality of switches within a network, the routing information including forwarding tables that list forwarding rules for forwarding packets within the network;
    a forwarding rules splitting module configured to split the received routing information into N portions;
    N match modules, each of the N match modules configured to process one of the N portions by identifying forwarding rules that pertain to each of M subnets belonging to the network, wherein a forwarding rule pertains to an Mth subnet if a prefix representing the Mth subnet can be fully included within a prefix associated with the forwarding rule;
    a grouping module configured to form M groups of forwarding rules such that each group only includes forwarding rules that pertain to the same Mth subnet; and
    M graphing modules, each of the M graphing modules configured to generate M forwarding graphs for the M subnets, each of the M forwarding graphs being generated using the corresponding Mth group of forwarding rules, wherein M and N are integers greater than 1.

11. The system of claim 10, wherein each of the M graphing modules is further configured to identify graph properties representative of network anomalies within the corresponding forwarding graph.

12. The system of claim 10, wherein the N match modules are implemented in parallel over N separate servers.

13. The system of claim 10, wherein the M graphing modules are implemented in parallel over M separate servers.

14. The system of claim 10, wherein the M subnets are determined from the routing information.

15. The system of claim 14, wherein the M subnets are stored in the form of a trie data structure, and wherein each of the N match modules is configured to identify all the subnets within the trie that have their prefix fully included within a prefix associated with the forwarding rule.

16. The system of claim 10, wherein the forwarding rules include a network address and at least one of a next hop switch identifier, a local switch identifier, and a priority.

17. The system of claim 12, wherein the N match modules are implemented in parallel utilizing N mapping functions of a MapReduce system.

18. The system of claim 13, wherein the M graphing modules are implemented in parallel utilizing M reduce functions of a MapReduce system.

19. The system of claim 11, wherein the graph properties representative of network anomalies can include at least one of strongly connected components and zero-out degree within the corresponding forwarding graph.

* * * * *